(No Model.)
D. E. REARDON.
SOD CUTTER AND CRUSHER.
No. 514,335. Patented Feb. 6, 1894.
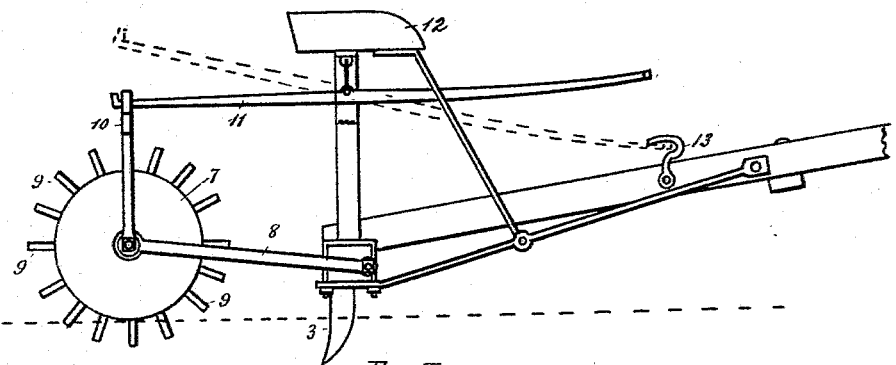
Fig. I.
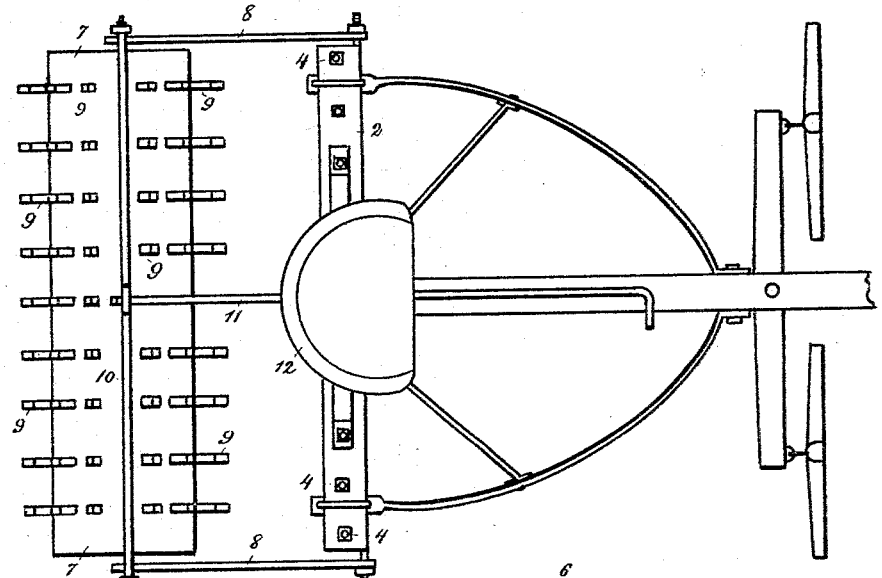
Fig. II.
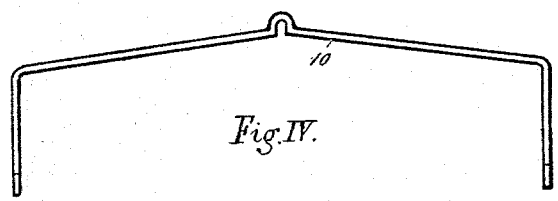
Fig. IV.
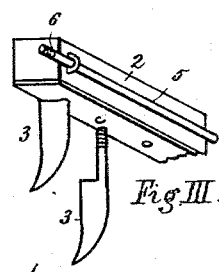
Fig. III.
Witnesses
R. S. Millar
L. M. Adams
Inventor
D. E. Reardon
By J. Bailey Atty
THE NATIONAL LITHOGRAPHING COMPANY,
WASHINGTON, D. C.

UNITED STATES PATENT OFFICE.

DANIEL E. REARDON, OF CLARENDON COUNTY, SOUTH CAROLINA.

SOD CUTTER AND CRUSHER.

SPECIFICATION forming part of Letters Patent No. 514,335, dated February 6, 1894.

Application filed April 1, 1893. Serial No. 468,681. (No model.)

*To all whom it may concern:*

Be it known that I, DANIEL E. REARDON, a citizen of the United States, residing in the county of Clarendon and State of South Carolina, have invented a new and useful Improvement in Sod Cutters and Crushers, which improvement is fully set forth in the following specification and accompanying drawings, in which—

Figure 1 is an end view of my improved sod-cutter and crusher; Fig. 2, a plan view of the same; Fig. 3, a perspective detail view of a part of the main beam and Fig. 4, the frame on which the roller is adjustably suspended.

My invention relates to an improvement in agricultural implements and its object is to provide a simple and efficient light-draft device, whereby sod-ground may be easily and quickly divided and at the same time crushed and thoroughly pulverized.

A secondary but important object of the invention is to supplant the use of plows and other implements, generally used for the same purpose, which require much longer time and greatly increased power to perform the same work.

The invention consists in the peculiar construction and combination of the several parts of the machine, as described in the following specification and accompanying drawings, in which 2 designates the main cross-beam strengthened on top and bottom by metal plates and provided at regular intervals with backwardly curved knives 3. The shanks of the knives are threaded and securely fastened to the beam by nuts 4. A groove is formed in the front of the beam and contains a metal bar 5 having pivots 6 formed on its ends. The roller 7 is provided with similar pivots having right and left threads, and is connected with the beam pivots by link bars 8. Blunt headed pins or breakers 9 are inserted in the roller and are arranged in transverse rows which travel midway in the intervals between the knives. The roller is suspended on a yoke or frame 10. The rear end of a lever 11 is attached to the center of the frame and extends forwardly and is hung under the driver's seat 12. It will be seen that the roller is thus entirely under control of the driver and can be held at any desired elevation and that the machine may be used as a harrow by securing the free end of the lever under the hook 13.

It will be understood that the form of the breaking pins may be varied and their number increased or diminished according to the nature and condition of the soil.

What I claim as new is—

In a sod cutter, the combination with the main beam, having the cutters or knives attached thereto, the roller having pins or breakers inserted therein, and pivotally attached by link bars connecting the ends of the roller shaft to the ends of the bar secured to the front of the main beam, and also being adapted to travel in the rear of the knives on the main beam, and vertically adjustable by means of the yoke by which it is suspended and by the lever hung under the driver's seat and centrally connecting with said yoke, the several parts constructed, and all arranged and combined in the manner and for the purposes set forth.

In testimony that I claim the foregoing I have hereunto set my hand, this 22d day of March, 1893, in the presence of witnesses.

DANIEL E. REARDON.

Witnesses:
T. W. BROWN,
M. L. SAULS.